April 26, 1927.  G. K. V. JOHANSON  1,626,538

FLUID METER

Filed Dec. 22, 1921

G.K.V. Johanson  INVENTOR.

BY

Marks & Clerk  ATTORNEYS

Patented Apr. 26, 1927.

1,626,538

UNITED STATES PATENT OFFICE.

GEORG KARL VILHELM JOHANSON, OF STOCKHOLM, SWEDEN, ASSIGNOR TO SVENSKA AKTIEBOLAGET GASACCUMULATOR, OF STOCKHOLM, SWEDEN.

FLUID METER.

Application filed December 22, 1921, Serial No. 524,284, and in Sweden January 13, 1921.

The present invention refers to a fluid meter, which is distinguished by a simple and cheap construction and by means of which the fluid flowing through the meter may be measured in a reliable manner.

Figure 1:
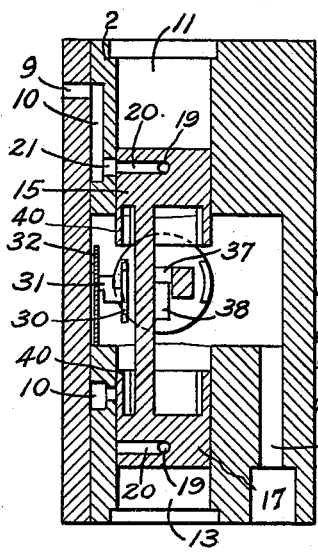
Figure 2:
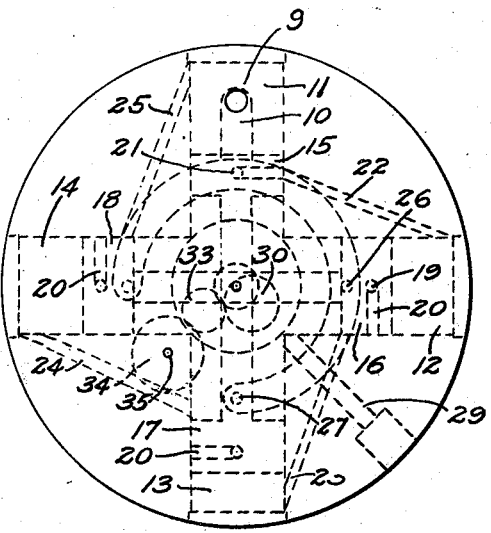
Figure 3:
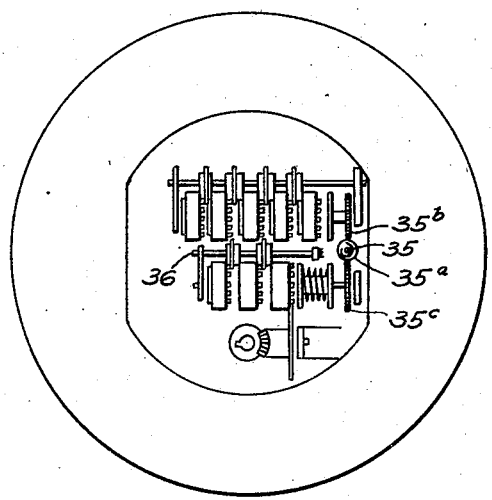

On the accompanying drawing Fig. 1 is a longitudinal section through a construction according to the invention, Fig. 2 is a view of one end of the meter, and Fig. 3 shows an end view of the other end of the meter with the registering apparatus.

In the casing of the meter a circular arcuate supply channel 10 is provided, through which the fluid to be measured is conducted from the inlet 9 to the meter proper, which in the construction shown consists of four cylinder chambers 11, 12, 13, 14 with pistons 15, 16, 17, 18 movable in the same. The cylinder chambers are arranged with their longitudinal axes in one and the same plane, two and two diametrically opposite to one another whereby the pistons of opposite cylinders two and two are coupled together with one another, so that when one of said two pistons, as 15, is in its one end position, the opposite piston 17 is in its opposite end position. Each cylinder is closed by a head (not shown), threaded or secured in some suitable manner at the outer end of the cylinder. Each piston is provided with a channel 19, 20, going through the piston the one end 19 of which channel in the one end position of the piston communicates with the circular arcuate supply channel 10 through an opening 21 in the cylinder wall, see Fig. 1, whereas simultaneously the other end 20 communicates with a channel 22, leading to the cylinder chamber on the outer side of the one piston 16 of the other pair of cylinders. The fluid thus flows under pressure through the channel 19, 20 of the piston 15, and through the channel 22 to the cylinder chamber 12, whereby the piston 16 is moved forwards on the drawing Fig. 2 from the right to the left. Similar channels 23, 24, 25 connect the inner part of the cylinder chamber 12 with the outer part of the cylinder chamber 13, the inner part of said cylinder chamber 13 with the outer part of the cylinder chamber 14, and the inner part of cylinder chamber 14 with the outer part of the cylinder chamber 11 respectively. When the piston 16 has reached its inner end position (to the left on the drawing) its channel 19 communicates with an opening 26 in the circular arcuate channel 10. The piston 16 then occupies the position previously occupied by the piston 15 and fluid is therefore transmitted under pressure through the channel 19, 20 of the piston 16 and the channel 23, which now is in communication with the channel 20, to the outer part of the cylinder chamber 13 whereby the piston 17 is moved inwards (upwards on the drawing). In a similar manner fluid is transmitted under pressure through the channel 19, 20 of the piston 17 and the channel 24 to the cylinder chamber 14. when the piston 17 has reached its upper end position and its channel 19 communicates with the circular arcuate channel 10 through the opening 27. When the piston 18 has reached its inner end position (to the right on the drawing) fluid flows through the channel 19, 20 of the piston 18 and the channel 25 to the cylinder chamber 11, so that the piston 15 is moved inwards (downwards on the drawing). The operation described is then repeated.

When the piston 16 moved inwards as described, the opposite piston 18, which is firmly connected with the same simultaneously moves outwards. Each piston is provided with an extension 40 which closes the openings 21, 26 and 27 respectively. The fluid filling the cylinder chamber 14, is then pressed by the piston through the channel 24, the inner opening of which in the cylinder chamber 13 having been opened by the piston 17, which now occupies its outer end position, to the central chamber 28, in which all the cylinder chambers 11, 12, 13, 14 open and from said central chamber through the channel 29 to the vaporizer of the engine. In the same manner the fluid in the outer part of the opposite cylinder chamber 11 is pressed on the movement of the piston 17 upwards through the channel 25. the end of which opens in the inner part of the cylinder chamber 14 and has been opened by the piston 14 on the upward movement of the same, to the central chamber 28 and to the vaporizer. On the inward movement of the pistons 18, 15 the fluid in the outer parts of the cylinder chambers 12, 13 is pressed through the channels 22, 23 to the central discharge chamber 28 and to the vaporizer, so that the content of fluid in the outer cylinder chambers 11, 12, 13, 14 during the movement of the pistons 15, 16, 17, 18 outwards is successively conducted to the vaporizer.

As the volume of fluid conducted to the vaporizer at each such motion of the pistons is known, the fluid can be measured by counting the strokes of the pistons.

The said counting is established according to the invention in such a manner, that the pistons 15, 16, 17, 18 during their inward motion abut against or actuate a disk 30 on a crank 31, journaled in the casing 2, so as to rotate the crank. Any other eccentric device of any kind may also be used. On the crank shaft a cog wheel 32 is mounted, actuating a shaft 35 through cog wheels 33, 34, Fig. 2, from which shaft the registering apparatus 36 is put in motion by means of the screw 35$^a$ on shaft 35 and the wheels 35$^b$, 35$^c$, Figure 3, which view is turned so as to avoid showing the registering apparatus in perspective. Said latter apparatus is arranged in such a manner, that the direct consumption, thus the volume of fluid flowing through the registering apparatus, may be seen as well as the volume of fluid remaining in the fluid receiver.

The pistons as described above are positively connected together in pairs so that the pistons of each pair move simultaneously. In order to prevent one pair of pistons moving before its appointed time, i. e., before the other pair has reached either of its extreme positions, the positive connections between each pair are provided with guide members 37 and 38 respectively, so arranged that when the pistons 16, 18, are moving the end of the member 38 butts up against the side of the member 37, thus preventing the pistons 15, 17 from moving until pistons 16, 18 have reached either of their extreme positions. At either extreme position of the pistons 16, 18 the member 38 just clears the member 37 and thus no longer prevents the pistons 15, 17 from moving. Similarly the member 38 prevents pistons 16, 18 from moving until said pistons 15, 17 have reached either of their extreme positions.

Having now particularly described my invention and in what manner the same is to be performed, what I claim is:

1. A fluid meter, comprising in combination a casing having a circular arcuate fluid supply channel and a plurality of similar cylinder chambers with two ports therein, said ports being connected by channels to the circular arcuate supply channel and the outer port of the next adjacent cylinder chamber respectively, a plurality of pairs of pistons, having passages therethrough, slidable in said cylinder chambers, a positive connection between the pistons of each pair, means provided on said positive connections locking the respective pairs of pistons from moving until another pair has reached the end of its stroke, the passage in each piston registering at the end of its inward stroke with the said two ports in its respective cylinder chamber to conduct the fluid under pressure from said annular channel to the outer end of the next adjacent cylinder chamber, a rotatable shaft, a crank mounted upon said shaft, a disc mounted upon said shaft, a disc mounted upon said crank adapted to be actuated by the pistons at each stroke, and means for registering the revolutions of said shaft, as set forth.

2. A fluid meter comprising in combination a casing having an arcuate fluid supply channel and a central discharge chamber, a plurality of similar cylinder chambers disposed in said casing, each cylinder chamber having two ports communicating with the arcuate supply channel and the outer port of the next adjacent cylinder respectively, a plurality of pistons adapted to reciprocate in said cylinder chambers, each piston having two ports therein and a passage therethrough connecting said two ports, said two ports registering respectively with the two ports in the cylinder chamber at one extreme position of said pistons, means connecting the pistons together in pairs, means for locking said pistons so that only one pair can move at a time, a rotatable shaft adapted to be moved by said pistons, and a counting mechanism operated by the rotation of said shaft, as set forth.

In testimony whereof I have signed my name to this specification.

GEORG KARL VILHELM JOHANSON.